US010225524B2

(12) United States Patent
Oami

(10) Patent No.: US 10,225,524 B2
(45) Date of Patent: Mar. 5, 2019

(54) INFORMATION PROCESSING SYSTEM, INFORMATION PROCESSING METHOD, AND PROGRAM

(71) Applicant: NEC Corporation, Tokyo (JP)

(72) Inventor: Ryoma Oami, Tokyo (JP)

(73) Assignee: NEC Corporation, Tokyo (JP)

(*) Notice: Subject to any disclaimer, the term of this patent is extended or adjusted under 35 U.S.C. 154(b) by 171 days.

(21) Appl. No.: 14/784,378

(22) PCT Filed: Mar. 20, 2014

(86) PCT No.: PCT/JP2014/057743
§ 371 (c)(1),
(2) Date: Oct. 14, 2015

(87) PCT Pub. No.: WO2014/171258
PCT Pub. Date: Oct. 23, 2014

(65) Prior Publication Data
US 2016/0055651 A1 Feb. 25, 2016

(30) Foreign Application Priority Data

Apr. 16, 2013 (JP) ................. 2013-085632

(51) Int. Cl.
H04N 7/18 (2006.01)
H04N 5/232 (2006.01)
(Continued)

(52) U.S. Cl.
CPC ......... H04N 7/181 (2013.01); G06K 9/00771 (2013.01); G06T 7/246 (2017.01);
(Continued)

(58) Field of Classification Search
CPC .... G06K 9/00771; H04N 7/181; H04N 7/188; G06T 7/246; G06T 7/292; G06T 2207/30196; G06T 2207/30232
See application file for complete search history.

(56) References Cited

U.S. PATENT DOCUMENTS

2014/0050455 A1* 2/2014 Ni ..................... H04N 9/8227
386/224
2014/0334684 A1* 11/2014 Strimling ........... G06K 9/00771
382/105

FOREIGN PATENT DOCUMENTS

JP 2006-93955 4/2006
JP 2006-146378 6/2006
(Continued)

OTHER PUBLICATIONS

International Search Report and Written Opinion dated Jun. 17, 2014 in corresponding PCT International Application.
(Continued)

Primary Examiner — Sathyanaraya V Perungavoor
Assistant Examiner — Peet Dhillon
(74) Attorney, Agent, or Firm — Finnegan, Henderson, Farabow, Garrett & Dunner, L.L.P.

(57) ABSTRACT

An information processing system includes: a first input unit configured to receive an input of a video captured by each of a plurality of image capturing devices; a selection unit configured to select a different moving object that is different from a tracking-target moving object in the video captured by a first image capturing device of the plurality of video devices, from among moving objects in the video captured by the first image capturing device; and an estimation unit configured to estimate a time point at which the tracking-target moving object is to appear, based on whether or not the different moving object has appeared in the video
(Continued)

captured by a second image capturing device of the plurality of image capturing devices.

19 Claims, 6 Drawing Sheets

(51) Int. Cl.
  *G06K 9/00*     (2006.01)
  *G06T 7/246*    (2017.01)
  *G06T 7/292*    (2017.01)
(52) U.S. Cl.
  CPC .......... *G06T 7/292* (2017.01); *H04N 5/23293* (2013.01); *H04N 7/188* (2013.01); *G06T 2207/10016* (2013.01); *G06T 2207/10024* (2013.01); *G06T 2207/30196* (2013.01); *G06T 2207/30232* (2013.01)

(56) References Cited

FOREIGN PATENT DOCUMENTS

| JP | 2006-221355 | 8/2006 |
| JP | 2006-301995 | 11/2006 |
| JP | 2007-142527 | 6/2007 |
| JP | 2009-17416  | 1/2009 |
| JP | 2010-204832 | 9/2010 |

OTHER PUBLICATIONS

Notification of Reasons for Refusal dated Apr. 24, 2018, by Japanese Patent Office in counterpart Japanese Patent Application 2015-512370.

* cited by examiner

INFORMATION PROCESSING SYSTEM, INFORMATION PROCESSING METHOD, AND PROGRAM

CROSS-REFERENCE TO RELATED PATENT APPLICATIONS

This application is a National Stage Entry of International Application No. PCT/JP2014/057743, filed Mar. 20, 2014, which claims priority from Japanese Patent Application No. 2013-085632, filed Apr. 16, 2013. The entire contents of the above-referenced applications are expressly incorporated herein by reference.

TECHNICAL FIELD

Some aspects according to the present invention relate to an information processing system, an information processing method, and a program.

BACKGROUND ART

In recent years, systems that enable monitoring of a large area by using videos captured by multiple cameras have been developed. For example, PTL 1 discloses a system for estimating, on the basis of the average time period required for moving objects to move between capturable areas of monitoring cameras, a time point at which the moving object is expected to reach a different capturable area.

CITATION LIST

Patent Literature

PTL 1: Japanese Unexamined Patent Application Publication No. 2009-017416

SUMMARY OF INVENTION

Technical Problem

However, it is difficult to employ such a technique for estimating appearance of a person on the basis of time and distance as in PTL 1, when some delays occur between monitoring cameras or when a moving means other than walking, such as an elevator or an escalator, exists between the monitoring cameras.

Some aspects of the present invention have been made in view of the above-described problem. One of the aims of the aspects is to provide an information processing system, an information processing method, and a program that enable appropriate tracking of a tracking-target moving object to be carried out even when the speed of the moving object varies.

Solution to Problem

An information processing system according to the present invention includes a first input unit, a selection unit and an estimation unit. The first input unit configured to receive an input of a video captured by each of a plurality of image capturing devices. The selection unit configured to select a different moving object that is different from a tracking-target moving object in the video captured by a first image capturing device of the plurality of video devices, from among moving objects in the video captured by the first image capturing device. The estimation unit configured to estimate a time point at which the tracking-target moving object is to appear, based on whether or not the different moving object has appeared in the video captured by a second image capturing device of the plurality of image capturing devices.

An information processing method is carried out by an information processing system according to the present invention. The information processing method includes receiving an input of a video captured by each of a plurality of image capturing devices, selecting a different moving object that is different from a tracking-target moving object in the video captured by a first image capturing device of the plurality of image capturing devices, from among moving objects in the video captured by the first image capturing device, estimating a time point at which the tracking-target moving object is to appear, based on whether or not the different moving object has appeared in the video captured by a second image capturing device of the plurality of image capturing devices.

A non-transitory computer readable medium storing a program causes a computer to execute receiving an input of a video captured by each of a plurality of image capturing devices, selecting a different moving object that is different from a tracking-target moving object in the video captured by a first image capturing device of the plurality of image capturing devices, from among moving objects in the video captured by the first image capturing device, and estimating a time point at which the tracking-target moving object is to appear, based on whether or not the different moving object has appeared in the video captured by a second image capturing device of the plurality of image capturing devices.

Note that, in the present invention, "unit" or "means", "device", and "system" are not intended to simply indicate physical means but are intended to include the cases of implementing the functions of "unit" or "means", "device", and "system" by use of software. Moreover, the function of one of "unit" or "means", "device", and "system" may be implemented by two or more physical means or devices, or the functions of two or more of "unit" or "means", "device", and "system" may be implemented by a single physical means or device.

Advantageous Effects of Invention

According to the present invention, it is possible to provide an information processing system, an information processing method, and a program that enable appropriate tracking of a tracking-target moving object to be carried out even when the speed of the moving object varies.

DESCRIPTION OF EMBODIMENTS

Exemplary embodiments of the present invention are described below. In the following description and the drawings to be referred to, the same or similar numerals and characters are assigned to the same or similar components.

(1. First Exemplary Embodiment)

FIGS. 1 to 5 are drawings for illustrating a first exemplary embodiment. In the following description, the present exemplary embodiment is described with reference to the drawings as follows.

First, in "1.1", the outline of a configuration of a system and the outline of the entire first exemplary embodiment are provided. Thereafter, a functional configuration of the system is described in "1.2", and the flows of processes are described in "1.3". In "1.4", a concrete example of a hardware configuration capable of implementing the system is provided. Lastly, the effects of the present exemplary embodiment and the like are described in "1.5" and the subsequent sections.

(1.1 Outline)

Figure 1:
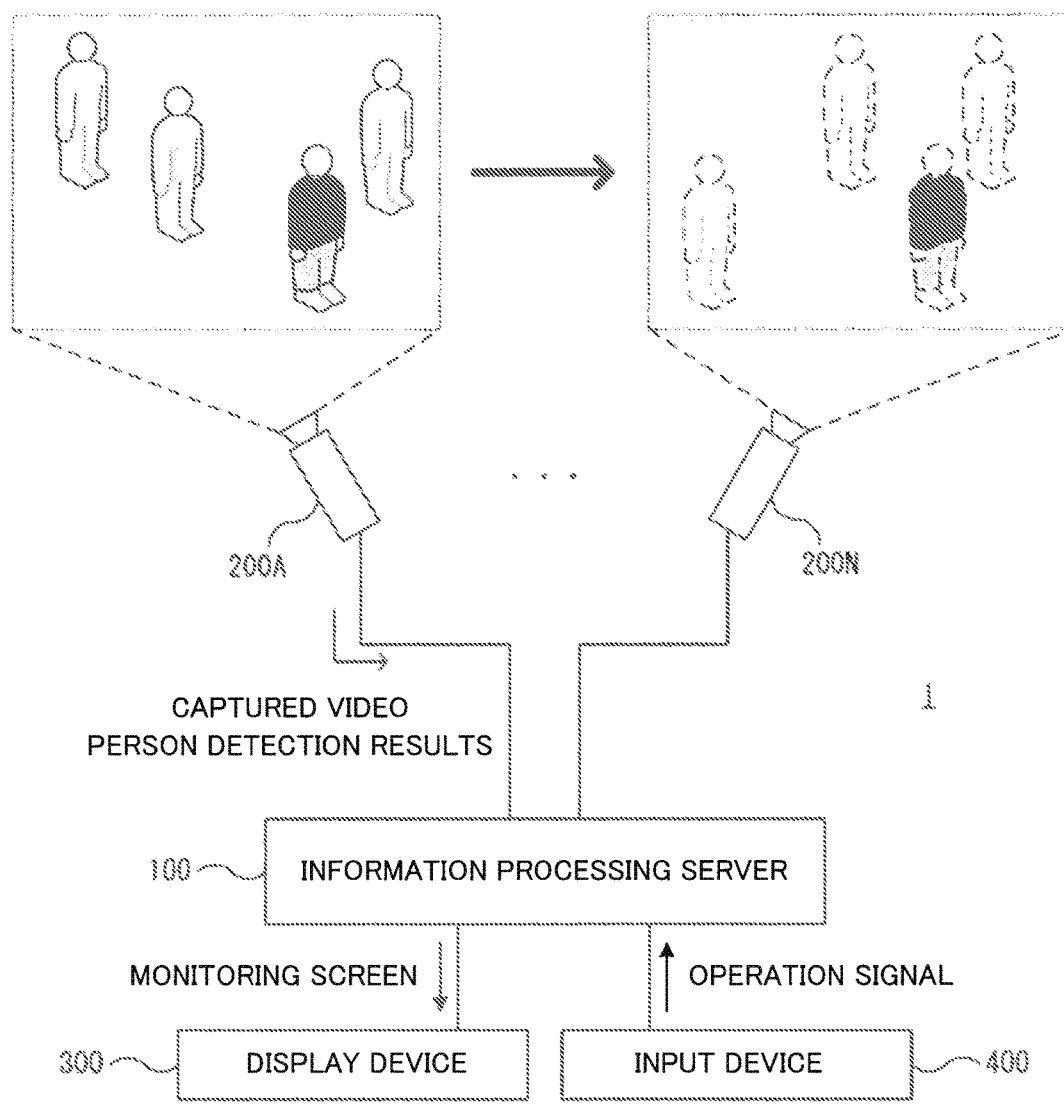
FIG. 1 is a functional block diagram schematically illustrating a configuration of a monitoring system according to a first exemplary embodiment.

A system configuration of a monitoring system 1, which is an information processing system according to the present exemplary embodiment, is described with reference to FIG. 1. FIG. 1 is a block diagram illustrating the system configuration of the monitoring system 1.

The monitoring system 1 includes an information processing server 100, video cameras 200 (video cameras 200A to 200N are collectively referred to as the video cameras 200), which are multiple image capturing devices capable of capturing (taking) videos (moving images), a display device 300, and an input device 400.

In the following description, it is assumed that the monitoring system 1 is a system for monitoring people captured in videos by the video cameras 200. However, monitoring targets are not limited to the above. For example, target objects may be objects (moving objects) that move, such as cars or motorcycles.

Each of the video cameras 200 captures a video, determines whether or not one or more people are included in the captured video, and transmits, to the information processing server 100, information such as a location or the feature related to each person together with the captured video. In addition to the above, the video cameras 200 can track a person in the captured video.

Processes such as those of detecting a person, extracting a feature, and tracking a person in each camera may be carried out by, for example, the information processing server 100 or an unillustrated, different information processor. In the following description, it is assumed that each of the video cameras 200 carries out the above processes.

The information processing server 100 carries out various processes of detecting a person, registering a person to track, tracking a registered person, and the like, by analyzing videos captured by the video cameras 200.

Description is mainly given below of a case in which a person is monitored (tracked) on the basis of real-time videos captured by the video cameras 200. However, the application is not limited to this case. For example, it is also conceivable that monitoring (analysis) may be carried out by the use of videos captured by the video cameras 200 and then stored in a storage device (e.g., a hard disk drive (HDD)) or a video cassette recorder (VCR). In some cases, monitoring may be carried out by reproducing, in the reverse order, (backward reproduction of) the video stored in the storage device and using the backward-reproduced video. In general, when a person acts suspiciously, it is necessary to check the action the person has taken before reaching the suspicious action. Hence, a means of monitoring through backward reproduction is highly effective.

During monitoring of a person by the information processing server 100, the information processing server 100 outputs a monitoring screen to the display device 300, for example. In addition, the information processing server 100 is capable of outputting, to the monitoring screen, information such as one indicating that there is a high probability that the person registered as a tracking target is to appear in a video soon. To enable this, the information processing server 100 has the function of estimating the time point at which a person captured in a video by one of the video cameras 200 (assumed to be the video camera 200A, here) (e.g., a person registered as a tracking target) is to appear in a different one of the video cameras 200 (assumed to be the video camera 200N, here).

In this example, it is assumed that the number of the video cameras 200 each having a possibility that the tracking-target person is to appear is one, i.e., the video camera 200N, for simplicity. However, the number of such video cameras 200 is not limited to this and may be two or more.

A conceivable method for estimating the time point at which a tracking-target person is to appear in the capturing area of the video camera 200N is, for example, one in which the distance between the capturing areas of the video camera 200A and the video camera 200N is divided by the average moving speed of the tracking-target person. In such the method, it is difficult to estimate, only on the basis of speed and distance, a time point at which the tracking-target person is to appear, for example, when the moving speed of the tracking-target person varies since there is a place where delay often happens between the video cameras 200, or when a moving means such as an elevator exists on the way.

Even when delay occurs or a different moving means exists on the way, the moving speeds of the people are similar to each other, i.e., the time points at which the people reach the video camera 200N are close to each other, in many cases. In view of this, the information processing server 100 according to the present exemplary embodiment extracts, when a tracking-target person is captured in the video by the video camera 200A, the people (each referred to as a reference person below) who are located ahead of (or behind) the tracking-target person in the moving direction of the tracking-target person. Then, the video camera 200N in which these people are expected to appear next finds out the extent of the people who have reached and thereby estimates a time point at which the tracking-target person is to appear.

In the tracking, a person having a feature that is largely different from features of the other people around the person may be set as the reference person (reference object), instead of tracking all the people located ahead of the tracking-target person. A time point at which the tracking-target person (target object) is to appear may be estimated on the basis of the reference person's appearing. There is a low probability of occurrence of an error in matching based on features between people having different features. Accordingly, setting the person that has a largely different feature as a reference person leads to increase the accuracy of estimating a time point at which the tracking-target person is to appear.

It is also conceivable, for example, in the case of setting two or more reference people, to add up the weights corresponding to how likely the tracking-target person is to appear, according to the number of people who have appeared among the reference people. Alternatively, it is also conceivable that a person who has a feature that is largely different from features of the other people around the person is constantly tracked and a time required to move between the video camera 200A and the video camera 200N is estimated on the basis of the result of the tracking.

To enable such person tracking, the information processing server 100 has the function of judging whether or not a person captured in a video by the video camera 200A matches one of the people captured in a video by the different video camera 200N (function of judging the correspondence relationship between people). Multiple techniques are conceivable for judging whether or not a person captured in a video by the video camera 200A and one of the people captured in the video by the video camera 200N match. One of the techniques is, for example, to extract features of the people from respective images of the people and to judge that the people match when a similarity between the features of the people is larger than a threshold value or when the similarity is larger than similarities of other people. A feature related to color information, posture, height, or face, for example, may be a feature to be extracted from an image of a person.

In the person monitoring (person tracking) by the information processing server 100, the information processing server 100 outputs various displays such as a monitoring screen to the display device 300 and receives, from the input device 400, operation signals based on various operation inputs related to the person monitoring. More specifically, for example, by displaying two or more videos input by the video cameras 200, on the monitoring screen displayed by the display device 300, the user, who is a monitoring person, can obtain information indicating where a monitored target person is located or how long it takes before the monitored target person appears.

The display device 300 is, for example, a display using liquid crystals or organic electro luminescence (EL) for displaying images. The display device 300 displays the monitoring screen output by the information processing server 100.

The input device 400 is a device used by the user (monitoring person) for inputting various kinds of information. For example, the input device 400 may be a pointing device such as a mouse, a track pad, or a touch panel, or a keyboard. Processes such as registering a monitoring-target person is carried out according to operations made to the input device 400 by the user.

The configuration of the information processing server 100, the display device 300, and the input device 400 may be changed in various ways. For example, the display device 300 and the input device 400 may be implemented as a single client. Alternatively, the functions of the information processing server 100, the display device 300, and the input device 400 may be implemented by three or more information processors. In the case where the display device 300 and the input device 400 are implemented as a single client, the client may perform some of the functions of the information processing server 100 according to the present exemplary embodiment.

(1.2 Functional Configuration of System)

Figure 2:
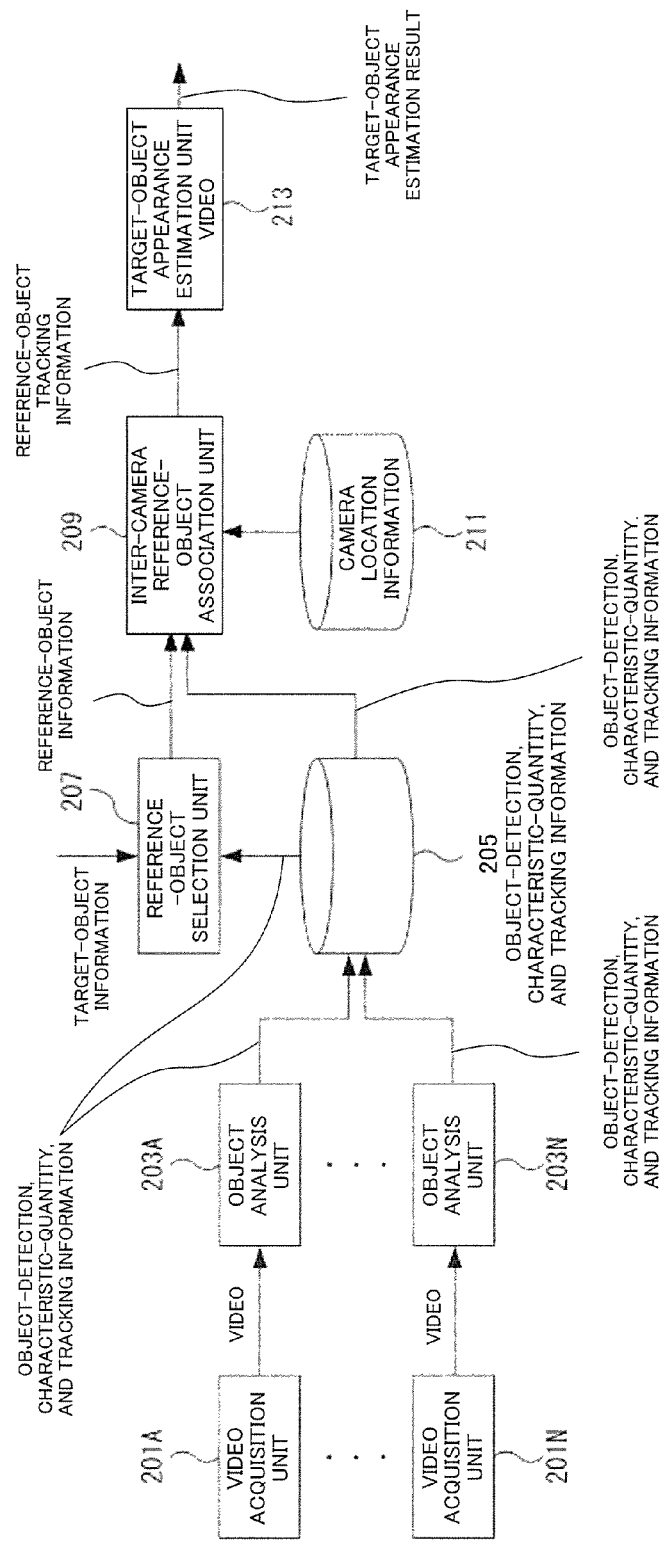
FIG. 2 is a functional block diagram schematically illustrating a configuration of an information processing server illustrated in FIG. 1.

A functional configuration of the monitoring system 1 is described below with reference to FIG. 2. As illustrated in FIG. 2, the monitoring system 1 includes: video acquisition units 201 (video acquisition units 201A to 201N are collectively referred to as the video acquisition units 201); object analysis units 203 (object analysis units 203A to 203N are collectively referred to as the object analysis units 203); object-detection, feature, and tracking information 205; a reference-object selection unit 207; an inter-camera reference-object association unit 209; camera location information 211; and a target-object appearance estimation unit 213. The functions of these units are described below in the above order.

(1.2.1 Video Acquisition Units 201)

Each of the video acquisition units 201 acquires a video of an actual scene captured by the corresponding one of the video cameras 200. Alternatively, the video acquisition unit 201 acquires an image by reproducing the video (or, in the case of a VCR, by capturing reproduced analog signals) captured by the video camera 200 and stored (recorded) in a storage device such as an HDD.

Here, "reproduce" means decoding encoded moving-image data (video data) and generating data on the original images (frames) and does not include displaying the generated result on a display. The reproduction speed does not need to be the same as the actual speed (actual recording speed), and the reproduction (decoding) may be at a higher speed than the actual when possible. Alternatively, it is possible to reproduce the video while skipping some video frames, instead of decoding all the frames. For example, when the video is encoded using a coding standard such as MPEG-2, the video data includes I, P, and B pictures. In such a case, only the I pictures or only the I pictures and the P pictures may be decoded.

In reproducing the video stored in the storage device, the conceivable cases are as follows: a case in which the video is acquired through forward reproduction; and a case in which the video is acquired through backward reproduction. In the following, description is given mainly of an example of the case of processing, in real time in the forward direction, the moving images captured by each of the video cameras 200.

(1.2.2 Object Analysis Units 203)

Each of the object analysis units 203 detects objects, e.g., people, from a video acquired by the corresponding video acquisition unit 201 and calculates the feature of each object. More specifically, for example, a person can be extracted by extracting a moving object in a background subtraction method, which uses the difference between a pre-generated background image and each frame image, and applying a detector that has learnt the features of the shape of a person or part of a person to the area of the extracted moving object. For example, the features of the color or the pattern of the clothes of the person may be extracted as the features of the person, in the form of a color histogram or an edge histogram. The object analysis unit 203 tracks each person extracted as an object, within the same field of view (in the same video captured by the corresponding single video camera 200) by way of comparison between time-series images (frames).

The object analysis unit 203 stores, for each detected and/or tracked person, information on the detection result, the feature, and/or the tracking result of the corresponding object, as the object-detection, feature, and tracking information 205, in an unillustrated storage medium.

(1.2.3 Reference-Object Selection Unit 207)

The reference-object selection unit 207 selects an object to serve as a tracking reference (referred to as a reference object below) on the basis of input target-object information and the stored object-detection, feature, and tracking information. Here, the target object is a tracking-target object, and the target-object information is information indicating an object to be registered as a tracking-target object. The tracking-target object is, for example, a moving object such as a person or a car. The target-object information may, for example, be input through an operation made to the input device 400 by a monitoring person or be input as a detected person by an unillustrated suspicious-action detection function.

For example, a method of selecting an object located ahead of (or slightly behind) the target object in the moving direction of the target object and having a distinctive feature may be employed by the reference-object selection unit 207 as a reference-object selection method. Here, having a distinctive feature means having a feature that is largely different from features of the other objects and hence facilitates tracking. Facilitating tracking means that an error is less likely to occur in identification matching. A method for judging whether or not the feature is distinctive is, for example, a method of constantly extracting the features of each object detected in a video captured by the corresponding video camera 200, calculating the frequency distribution of the features, and setting, when an object having infrequently occurring features appears, the object as a reference object. Here, the features of a detected object are, for example, the color or the like of the clothes of the person in the case where the object is a person. By setting a threshold value for occurrence frequency, it is possible to define an occurrence frequency considered to be low. Alternatively, for example, an object having a largely different feature in comparison with features of the objects located ahead of and behind, or around the object may be set as a reference object. In this case, the reference-object selection unit 207 calculates the similarity in terms of feature among the neighboring objects and extracts, as a reference object, each object having a similarity that is not larger than a certain value, or calculates the distance between the features of the neighboring objects and extracts, as a reference object, each object having a distance not smaller than a certain value.

In the case where a reference object is selected from the objects located ahead of (or slightly behind) the target object in the moving direction of the target object, the reference object does not necessarily be captured in a video at the same time as the target object. Thus, a reference object may be selected from among the objects that appear before or after a time point at which the target object is captured in the video and that move in the same direction as that of the target object among the objects that move in the same direction as the moving direction of the target object.

The selection of a reference object by the reference-object selection unit 207 may be carried out by extracting reference-object candidates, which can be constantly a reference object independent of input of target-object information, and setting, as a reference object, a reference object candidate that is located near the target object among the reference object candidates, upon receipt of an input of target-object information. Alternatively, the reference-object selection unit 207 may select a reference object by comparing the features of the objects located near the target object, upon receipt of an input of target-object information.

Regarding the range ahead of or behind the target object in which a reference object is to be selected, a reference object may be selected, for example, from among the reference object candidates selected in the above-described method that had appeared or appears within a certain time period before or after the time point at which the target object appears, or the certain number of reference object candidates located ahead of or behind the target object among the reference object candidates selected in the above-described method may be set as reference objects.

In the case where multiple reference objects are to be selected, the number of reference objects may be dynamically changed according to the distance between the video cameras 200 or whether or not a moving means exists (whether or not there is any elevator or escalator) between the video cameras 200. More specifically, for example, when the distance between the video cameras 200 is short, the level of ambiguity in movement between the capturing areas of the video cameras 200 is low, and hence the number of reference objects may be small. In contrast, when the distance between the video cameras 200 is long, or when a moving means, such as an elevator or an escalator, that is likely to cause changes in the order of the objects exists between the capturing areas of the video cameras 200, a large number of objects may be selected as references.

(1.2.4 Inter-camera Reference-object Association Unit 209)

The inter-camera reference-object association unit 209 estimates one of the video cameras 200 in which the reference object selected by the reference-object selection unit 207 is to appear next after disappearing from the angle of view of the video camera 200 (referred to as the video camera 200A below), with reference to the camera location information 211. Further, the inter-camera reference-object association unit 209 judges whether or not the reference object has appeared at the angle of view of the estimated video camera 200. The estimated video camera 200 in which the target object and the reference object are expected to appear next is referred to as the video camera 200N below. If an object appearing in the video captured by the estimated video camera 200 is judged as the reference object, the inter-camera reference-object association unit 209 associates these objects with each other as the same object.

In a method for judging whether or not an object appearing in the video captured by the video camera 200N is the reference object that has disappeared from the video captured by the video camera 200A, first, the reference-object selection unit 207 selects the video camera 200N having a probability that the reference object is to appear not smaller than a certain value. Upon appearance of an object in the video camera 200N, the reference-object selection unit 207 carries out matching between the features of the object that has just appeared and the reference object. As a result of the matching, the reference-object selection unit 207 selects an object from among the objects that have appeared, the selected object having the largest similarity (the smallest distance value) with respect to the reference object. When the similarity is not smaller than a threshold value, the inter-camera reference-object association unit 209 associates the object that has just appeared with the reference object as the same object.

Alternatively, the inter-camera reference-object association unit 209 calculates the probability (likelihood) that the objects are the same, based on the similarity (or distance) between the features of the objects, and calculates the probability that the objects are the same, based on the time point at which the reference object appeared in the video camera 200N (appearing time point). The object having the largest probability obtained by multiplying the probabilities may be identified. In this case, for example, when the probability obtained through the multiplication is not smaller than a threshold value, the inter-camera reference-object association unit 209 may associate the object and the reference object with each other as the same object.

The inter-camera reference-object association unit 209 may carry out association in consideration of the speeds of the individual objects. More specifically, the inter-camera reference-object association unit 209 calculates the moving speed of the reference object by analyzing the movement of the reference object until the reference object disappears from the frames of the video captured by the video camera 200A. The inter-camera reference-object association unit 209 changes the appearance probability obtained on the basis of the appearing time point, according to the moving speed. In this case, for example, when the moving speed of the reference object is higher than the moving speeds of all the other objects, the inter-camera reference-object association unit 209 compresses, on the basis of the difference in speed and the distance between the video cameras 200, the time distribution of the appearance probabilities in the time direction so as to shift forward the time point at which the probability is the highest.

Here, the camera location information 211 referred to by the inter-camera reference-object association unit 209 indicates the spatial position relationship between the multiple provided video cameras 200, and concretely includes information on the neighboring relationship between the video cameras 200, the distances between the video cameras 200, or the average time periods required to move between the video cameras 200, for example. The information on the neighboring relationship is described in association with the field of view of the video cameras 200. With reference to the camera location information 211, the inter-camera reference-object association unit 209 can estimate the video camera 200 in which the object is to appear next after disappearing from the frames of the video camera 200.

(1.2.5 Target-object Appearance Estimation Unit 213)

The target-object appearance estimation unit 213 estimates a time point at which the target object is to appear, based on the reference-object tracking information, and outputs the result of the object appearing estimation. More specifically, for example, the target-object appearing estimation unit 213 associates each reference object with one of the reference objects that move ahead of the target object and one by one appear in the video camera 200N, on the basis of the positional relationship at the time when the target object and the reference objects were detected in the video camera 200A. The target-object appearing estimation unit 213 estimates that the probability that the target object is to appear in the video camera 200N increases as the association advances, and outputs the estimation result. If the moving speed of each of the reference objects and the moving speed of the target object are different from each other, the estimation may be made in consideration of the relative moving speed. In other words, the target-object appearing estimation unit 213 calculates the relative moving speed of the target object and each of the reference objects on the basis of the object-detection, feature, and tracking information 205. The target-object appearing estimation unit 213 may estimate a time point at which the target object appears, by correcting the estimated time period from the time point at which the reference object was detected by the video camera 200N to the time point at which the target objects is to be detected by the video camera 200N, by use of the calculated value.

In some cases, even though the reference objects located behind the target object appeared in the video camera 200N, the video camera 200N had not been detected the target object. In such a case, the target-object appearing estimation unit 213 may output an alert (warning).

Here, the probability that the target object appears after a reference object in the video captured by the video camera 200N can be calculated from the time points at which the reference objects and the target object disappeared from the frames captured by the video camera 200A and the time points at which the reference objects that have appeared in the frames captured by the video camera 200N by the current time point (the time point targeted for processing) appeared in the frames. The target-object appearing estimation unit 213 estimates the average time period required to move between the video cameras 200 at the current time point, on the basis of the time points at which the one or more reference objects disappeared from the frames captured by the video camera 200A and the time points at which the one or more reference objects appeared in the frames captured by the video camera 200N. By using the results, the target-object appearing estimation unit 213 obtains the time distribution of the appearance probability.

As a method for this, for example, it is conceivable to obtain the difference between the average moving time period at the current time point and the average moving time period in an ordinary case and to expand or contract, by the difference, the time distribution of the appearance probability in the ordinary case in the time direction. Alternatively, it is conceivable to obtain the degree of variation (e.g., distribution) of the average time periods in an ordinary case required to move between the video cameras 200 among the reference objects, to obtain the degree of variation at the current time point, and to compare each of the degrees of variation with that in the normal case. For example, when the current degree of variation is larger than that of the ordinary case, the time distribution of appearance probability may just be expanded according to the difference. In the calculation of the average speed or the degree of variation, a larger weight may be assigned to the value of an object appearing closer to the current time point.

In the case where a moving means such as an escalator is located between the video cameras 200, a difference occurs between people (objects) who walk on the escalator and people who stand on the escalator. In view of this, the people who are supposed to have stood on the escalator and the people who are supposed to have walked on the escalator are separated from each other among the reference objects, the movement of each of the groups is estimated, and the estimation results are provided. When it is estimated that the target object is likely to walk on the escalator on the basis of previous tracking results, the appearance probability may be estimated in consideration of the information in a method of increasing the accuracy of estimation for the people who walk on the escalator.

In the case where a moving means such as an elevator exists between the video cameras 200, the movement of the objects changes at a burst. In such a case, the target-object appearing estimation unit 213 determines which objects took the elevator that has already arrived at or before the current time point, on the basis of the reference objects that have appeared in the video camera 200N, and calculates the probabilities that the target object took the elevator that has just arrived at the current time point, will take the elevator that is to arrive next, and is to take an elevator that is to arrive several times later. When it is highly likely that the target object is in the elevator that is to arrive next, it is estimated that the target object is highly likely to appear when people appear next in the video captured by the video camera 200, and hence the appearance probability is increased. In contrast, when it is highly likely that the target object is to take the next elevator, the time point at which the elevator is to arrive may be estimated, and the time distribution of the appearance probability of the target object may be calculated.

More detailed description is given below. Assume that the current time point is t and people appearing within the field of view of the video camera 200N increased at a burst, a time period Δt before the current time point t. When the average moving time period from the time point at which a person steps off an elevator to the time point at which the person appears in the video camera 200N is denoted by $T_d$, the time point at which the elevator taken by a person who appeared in the video camera 200N at the time point t−Δt is to arrive is estimated to be t−Δt−$T_d$. When the average time period required to move by the elevator from the floor where the video camera 200A is located to the floor where the video camera 200N is located is denoted by $T_c$, the time point at which the elevator left the floor where the video camera 200A is located is estimated to be t−Δt−$T_d$−$T_c$. When the average time interval at which the elevator leaves (arrives) is denoted by D, the time point at which the elevator leaves the floor where the video camera 200A is located, n times later is estimated to be t−Δt−$T_d$−$T_c$+nD.

When the time point at which the target object moved out from the field of view of the video camera 200A is denoted by t' and the average moving time from the video camera 200A to the elevator is denoted by $T_a$, the time point at which the target object arrives at the elevator is estimated to be t'+$T_a$. Hence, there is a high probability that the target object takes the elevator n times later, where n is an integer that satisfies $$t-\Delta t - T_d - T_c + (n-1)D \leq t' + T_a < t - \Delta t - T_d - T_c + nD \qquad \text{[Math. 1]}$$

On the basis of the following equation $$n = \left\lceil \frac{t' - t + \Delta t + T_a + T_c + T_d}{D} \right\rceil \qquad \text{[Math. 2]}$$

the time point at which the target object is to appear in the video camera 200N is estimated to be t−Δt+nD.

Here, the value D can be calculated from the time intervals between the time points at which the objects increase in the video camera 200N at a burst. Since the value $T_a$+$T_d$ corresponds to the total of the time period required to move from the video camera 200A to the elevator and the time period required to move from the elevator to the video camera 200N, the value $T_a$+$T_d$ can be calculated as long as the distance between the video camera 200A and the elevator and the distance between the elevator and the video camera 200N are known. The value $T_c$ can be estimated from the inter-camera moving time periods of the reference objects. The value obtained by subtracting the value $T_a$+$T_d$ from the inter-camera moving time period of each of the reference objects corresponds to the total value combining the value $T_c$ and the time period in which the reference object waiting for the elevator. Since the reference object that arrived at the elevator at the latest time point has the shortest time period of waiting for the elevator among the reference objects taking the same elevator, the value $T_c$ can be approximately estimated by subtracting the value $T_a$+$T_d$ from the shortest inter-camera moving time period among those of the reference objects taking the same elevator.

In a strict sense, the value $T_c$ obtained as described above is larger than the actual value $T_c$ by the queuing time period of the reference object that arrived at the latest time point (which is significantly smaller than any of the queuing time periods of the other reference objects). In view of this, the expected value of the queuing time period may be calculated, and the obtained expected value may be subtracted from the obtained value $T_c$.

When it is supposed that a queue for taking the elevator has been formed, as in a case where no reference objects have appeared for a certain time period, the appearance probability may be calculated in consideration of the information. When the queuing time period occurring due to queuing is denoted by $T_b$, the above-described value n is represented as follows.

$$n = \left\lceil \frac{t' - t + \Delta t + T_a + T_b + T_c + T_d}{D} \right\rceil \qquad \text{[Math. 3]}$$

In this case, the value $T_b$+$T_c$ is obtained by subtracting the value $T_a$+$T_d$ from the inter-camera moving time period of each of the reference objects. Accordingly, the value $T_b$+$T_c$ can be obtained in the same way as that for obtaining the value $T_c$ described above.

In the above description, only the average values are taken into account without taking account of the degrees of variation in the values indicating the time periods. However, the time point at which the target object is to arrive at the video camera 200N may be estimated by probabilistically modelling the values $T_a$, $T_b$, $T_c$, $T_d$, and D by taking account of the degrees of variation.

The result of the target-object appearing estimation by the target-object appearing estimation unit 213 is output as a monitoring screen displayed by the display device 300, for example, so as to notify, of the result, the user, who is a monitoring person.

(1.3 Flows of Processes)

Figure 3:
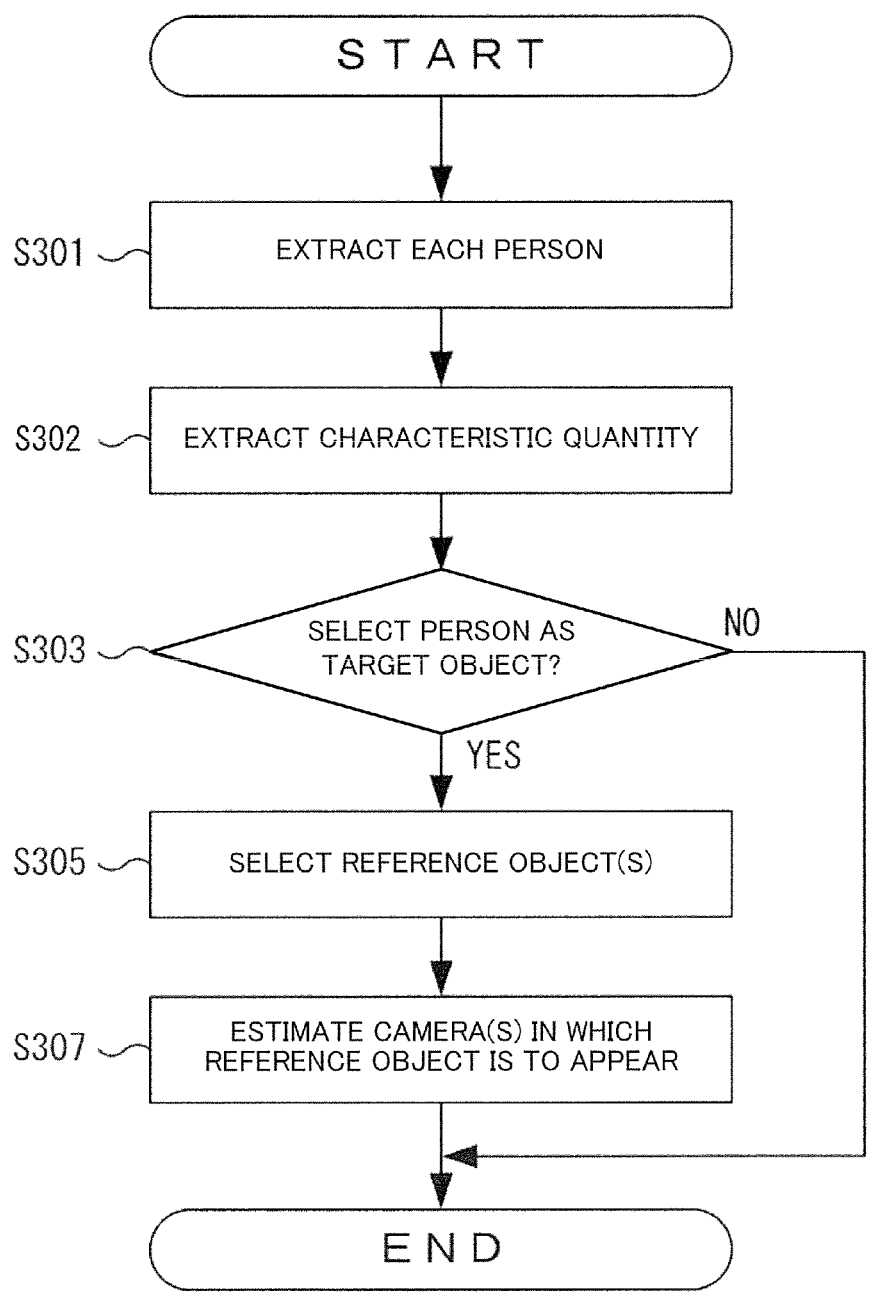
FIG. 3 is a flowchart presenting a flow of a process carried out by the information processing server illustrated in FIG. 1.
Figure 4:
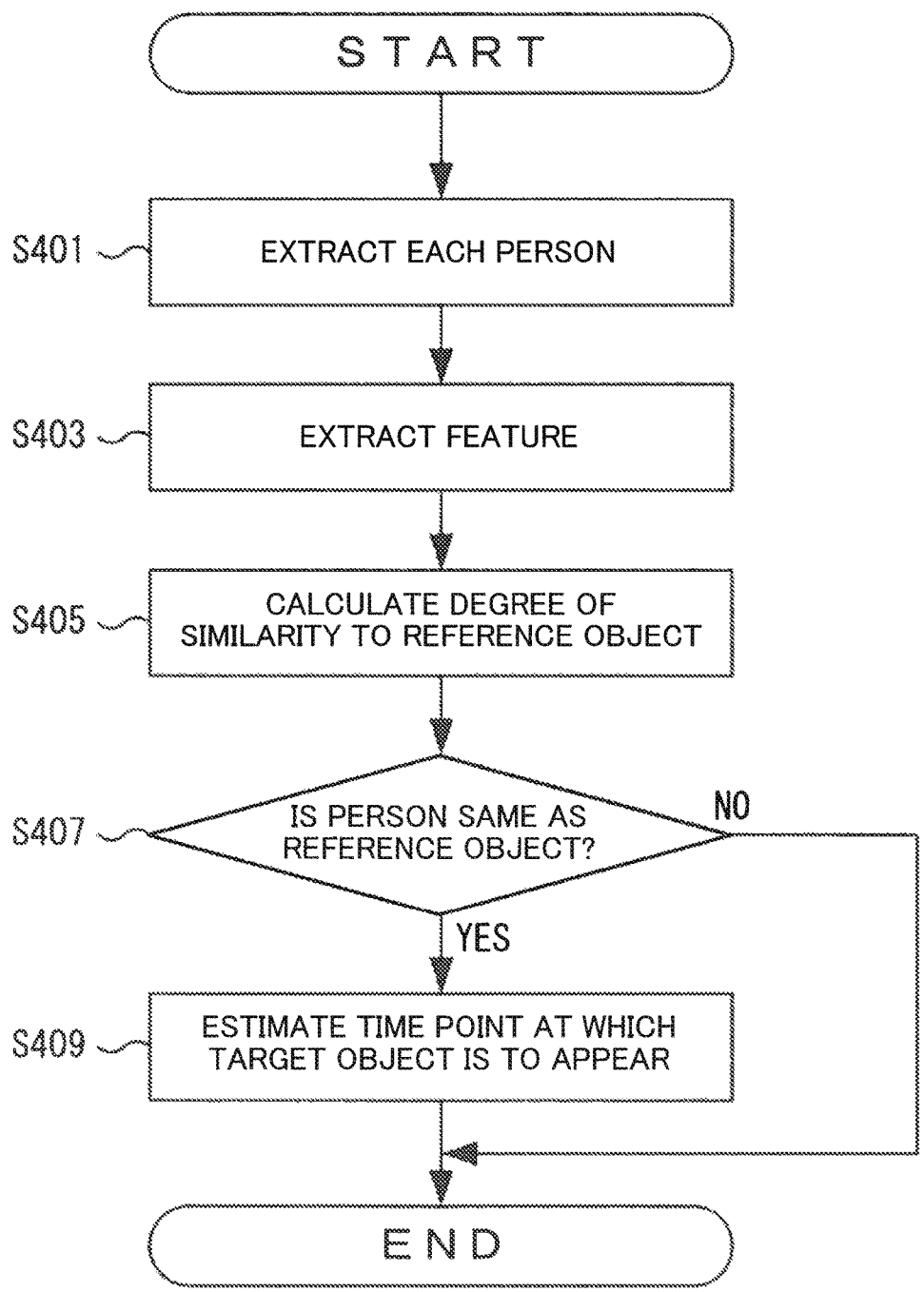
FIG. 4 is a flowchart presenting a flow of a process carried out by the information processing server illustrated in FIG. 1.

Next, flows of processes carried out by the monitoring system 1 are described with reference to FIGS. 3 and 4. FIGS. 3 and 4 are flowcharts each presenting a flow of a process carried out by the information processing server 100 according to the present exemplary embodiment.

The steps of each of the processes to be described below may be carried out in any modified order or in parallel as long as no conflict occurs in the processes. Moreover, one or more different steps may be added between the steps of each of the processes. Further, each step described as a single step for convenience may be carried out in multiple steps, and steps described as multiple steps for convenience may be carried out as a single step.

(1.3.1 Flow of Process Carried Out at Time of Selecting Target Object/Reference Object)

First, description is given of the flow of a process carried out in the video camera 200A at the time of selecting a target object and one or more reference objects, with reference to FIG. 3.

The object analysis unit 203 extracts object areas from an image captured by the video camera 200A and input by the video acquisition unit 201 (S301) and extracts the feature from each of the extracted object areas (object images) (S302). When the object is selected as a target object by a user operation or the like input, for example, via the input device 400 (Yes in S303), the reference-object selection unit 207 selects one or more reference objects from the objects located ahead of or behind the target object (S305). Then, the inter-camera reference-object association unit 209 estimates one or more video cameras 200N each of which has a probability that the reference objects are to appear next (S307).

(1.3.2 Flow of Process Carried Out in Target-Object Appearance Estimation)

Next, description is given of the flow of a process of estimating a time point at which the selected target object is to appear in a video captured by each of the video cameras 200N estimated in S307 described above, with reference to FIG. 4.

The object analysis unit 203 extracts object areas from an image captured by the video camera 200N and input by the video acquisition unit 201 (S401) and extracts the feature from each of the extracted object areas (S403). The inter-camera reference-object association unit 209 calculates the similarity between each of the reference objects selected by the reference-object selection unit 207 from the video captured by the video camera 200A in S305 in FIG. 3 and the object extracted from the video captured by the video camera 200N in S403 (S405). As a result, if it is judged that the objects are the same (Yes in S407), the inter-camera reference-object association unit 209 estimates a time point at which the target object is to appear (corresponding to the time distribution of the appearance probability), on the basis of the time point at which the reference object appeared (S409).

(1.4 Hardware Configuration)

Description is given below of an example of a hardware configuration in the case where the above-described information processing server 100 is implemented by a computer, with reference to FIG. 5. As described above, the functions of the information processing server 100 may be implemented by multiple information processors.

Figure 5:
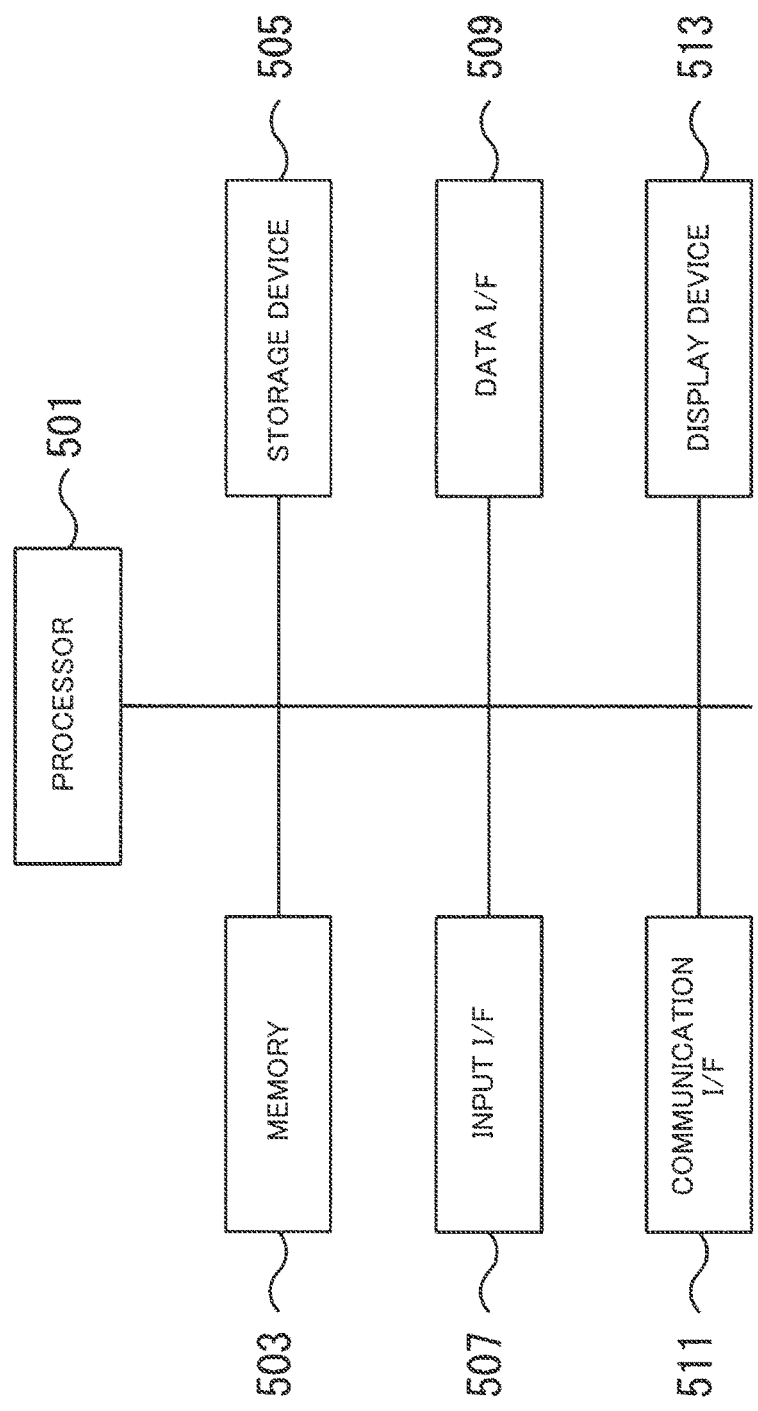
FIG. 5 is a block diagram illustrating a configuration of hardware that can implement the information processing server illustrated in FIG. 1.

As illustrated in FIG. 5, the information processing server 100 includes a processor 501, a memory 503, a storage device 505, an input interface (I/F) 507, a data I/F 509, a communication I/F 511, and a display device 513.

The processor 501 controls various processes carried out in the information processing server 100, by executing programs stored in the memory 503. For example, the processes related to the video acquisition unit 201, the object analysis unit 203, the reference-object selection unit 207, the inter-camera reference-object association unit 209, and the target-object appearance estimation unit 213 illustrated in FIG. 2 may be implemented as programs that are temporarily stored in the memory 503 and are to run mainly on the processor 501.

The memory 503 is storage medium such as a random access memory (RAM), for example. The memory 503 temporarily stores the program code of each of the programs to be executed by the processor 501 and data to be necessary at the time of executing the programs. For example, the memory area of the memory 503 includes stack areas to be necessary at the time of executing the programs.

The storage device 505 is a nonvolatile storage medium such as hard disk or a flash memory, for example. The storage device 505 stores: an operating system; various programs for implementing the video acquisition unit 201, the object analysis unit 203, the reference-object selection unit 207, the inter-camera reference-object association unit 209, and the target-object appearing estimation unit 213; or various kinds of data such as the object-detection, feature, and tracking information 205 and the camera location information 211. The programs or data stored in the storage device 505 are loaded onto the memory 503 when needed and are referred to by the processor 501.

The input I/F 507 is a device for receiving inputs from the user. The input device 400 described with reference to FIG. 1 may be implemented by the input I/F 507. Concrete examples of the input I/F 507 are a keyboard, a mouse, a touch panel, and various sensors. The input I/F 507 may be connected to the information processing server 100 via an interface such as a universal serial bus (USB), for example.

The data I/F 509 is a device for obtaining inputs of data from devices outside the information processing server 100. A concrete example of the data I/F 509 is a drive that reads data stored in various storage devices. The data I/F 509 may be provided outside the information processing server 100. In this case, the data I/F 509 is connected to the information processing server 100 via the interface such as a USB, for example.

The communication I/F 511 is a device for performing wired or wireless data communications with devices outside the information processing server 100, e.g., the video cameras 200. The communication I/F 511 may be provided outside the information processing server 100. In this case, the communication I/F 511 is connected to the information processing server 100 via an interface such as a USB, for example.

The display device 513 is a device that displays various kinds of information. The display device 300 described with reference to FIG. 1 may be implemented by the display device 513. Concrete examples of the display device 513 are a liquid crystal display and an organic electro-luminescence (EL) display. The display device 513 may be provided outside the information processing server 100. In this case, the display device 513 is connected to the information processing server 100 via a display cable, for example.

(1.5 Effects According to Present Exemplary Embodiment)

As described above, in the monitoring system 1 according to the present exemplary embodiment, a time point at which a target object, which is a tracking target, is to appear (or the time distribution of the appearance probability) is estimated on the basis of the time points at which one or more reference objects located ahead of or behind the target object appeared. Accordingly, even when the speed of the tracking-target moving object varies due to, for example, delays occurring between the video cameras 200 or a moving means, such as an escalator or an elevator, located between the video cameras 200 and changing the moving speed, the time point at which the target object is to appear can be appropriately estimated.

In the monitoring system 1 of the present exemplary embodiment, one or more objects each having a distinctive feature are selected as reference objects. This reduces errors in the association of reference objects (identification matching), which consequently increases the accuracy in the target-object appearance estimation.

(2 Second Exemplary Embodiment)

Figure 6:
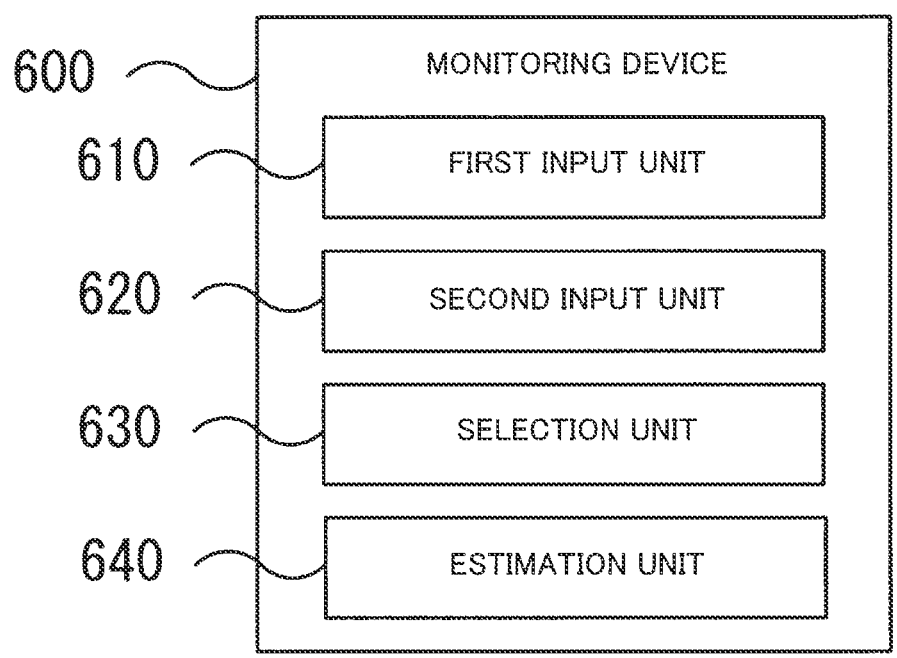
FIG. 6 is a functional block diagram schematically illustrating a configuration of a monitoring device according to a second exemplary embodiment.

The second exemplary embodiment is described below with reference to FIG. 6. FIG. 6 is a block diagram illustrating a functional configuration of a monitoring device 600, which is an information processing system. As illustrated in FIG. 6, the monitoring device 600 includes a first input unit 610, a second input unit 620, a selection unit 630, and an estimation unit 640.

The first input unit 610 receives inputs of videos captured by multiple image capturing devices, which are not illustrated.

The second input unit 620 receives inputs of information on a tracking-target moving object among the moving objects in the video captured by one of the multiple image capturing devices (referred to as a first image capturing device here).

The selection unit 630 selects one or more moving objects that are different from the tracking-target moving object (each referred to as a reference moving object here), from among the moving objects in the video captured by the first image capturing device.

The estimation unit 640 estimates a time point at which the tracking-target moving object is to appear, based on whether or not the one or more reference moving objects have appeared in the video captured by one of the multiple image capturing devices (referred to as a second image capturing device here).

According to the monitoring device 600 of the present exemplary embodiment with the above-described implementation, it is possible to appropriately track a tracking-target moving object even when the speed of the moving object varies.

(3 Supplementary Matters)

The configurations of the above-described exemplary embodiments may be combined, or some parts of the configurations may be replaced with each other. The configuration of the present invention is not limited to the above-described embodiments, and various modifications may be made within the range not departing from the gist of the present invention.

Some of or all of the above-described exemplary embodiments may be described as the following supplementary notes, but are not limited to the supplementary notes. The program of the present invention may be any as long as causing a computer to execute the operations described in the above-described exemplary embodiments.

(Supplementary Note 1)

An information processing system includes:

a first input unit that receives an input of a video captured by each of a plurality of image capturing devices;

a selection unit that selects a different moving object that is different from a tracking-target moving object in the video captured by a first image capturing device of the plurality of video devices, from among moving objects in the video captured by the first image capturing device; and an estimation unit that estimates a time point at which the tracking-target moving object is to appear, based on whether or not the different moving object has appeared in the video captured by a second image capturing device of the plurality of image capturing devices.

(Supplementary Note 2)

The information processing system according to Supplementary Note 1, further includes a second input unit that receives an input of information on the tracking-target moving object.

(Supplementary Note 3)

In the information processing system according to Supplementary Note 1 or 2, the selection unit selects, as the different moving object, a moving object from among the moving objects in the video captured by the first image capturing device, the selected moving object having a feature that is different from features of the moving objects by a value larger than a threshold value.

(Supplementary Note 4)

In the information processing system according to Supplementary Note 3, the selection unit constantly detects a moving object having a feature that is different from features of the moving objects by a value larger than the threshold value, and selects the different moving object from among the detected moving objects, each of which has a feature that is different from features of the moving objects by a value larger than the threshold value, in response to an input of information on the tracking-target moving object.

(Supplementary Note 5)

In the information processing system according to any one of Supplementary Notes 1 to 4, the estimation unit estimates a time point at which the tracking-target moving object is to appear, based on a time point at which each of the tracking-target moving object and the different moving object disappeared from a frame of the video captured by the first video device and a time point at which the different moving object appeared in a frame of the video captured by the second video device.

(Supplementary Note 6)

In the information processing system according to Supplementary Note 5, the estimation unit estimates a time point at which the tracking-target moving object is to appear, based on a difference between a moving time period from the time point at which the different moving object disappeared from the frame of video captured by the first image capturing device to the time point at which the different moving object appeared in the frame of the video captured by the second image capturing device and a corresponding moving time period of a moving object in an ordinary case.

(Supplementary Note 7)

In the information processing system according to Supplementary Note 6, the estimation unit calculates variation in moving time period from a time point of disappearing from a frame of the video captured by the first image capturing device to a time point of appearing in a frame of the video captured by the second image capturing device in an ordinary case, and estimates a time point at which the tracking-target moving object is to appear, on the basis of the variation.

(Supplementary Note 8)

In the information processing system according to any one of Supplementary Notes 1 to 7, when the different moving object located behind the tracking-target moving object in a moving direction in the video captured by the first image capturing device appeared in the video captured by the second image capturing device, the estimation unit makes notification.

(Supplementary Note 9)

An information processing method is carried out by an information processing system. The information processing method includes:

a step of receiving an input of a video captured by each of a plurality of image capturing devices;

a step of selecting a different moving object that is different from a tracking-target moving object in the video captured by a first image capturing device of the plurality of image capturing devices, from among moving objects in the video captured by the first image capturing device; and a step of estimating a time point at which the tracking-target moving object is to appear, based on whether or not the different moving object has appeared in the video captured by a second image capturing device of the plurality of image capturing devices.

(Supplementary Note 10)

The information processing method according to Supplementary Note 9, further includes a step of receiving an input of information on the tracking-target moving object.

(Supplementary Note 11)

In the information processing method according to Supplementary Note 9 or 10, a moving object is selected as the different moving object from among the moving objects in the video captured by the first image capturing device, the selected moving object having a feature that is different from features of the moving objects by a value larger than a threshold value.

(Supplementary Note 12)

In the information processing method according to Supplementary Note 11, a moving object having a feature that is different from features of the moving objects by a value larger than the threshold value is constantly detected, and the different moving object is selected from among the detected moving objects, each of which has a feature that is different from features of the moving objects by a value larger than the threshold value, in response to an input of information on the tracking-target moving object.

(Supplementary Note 13)

In the information processing method according to any one of Supplementary Notes 9 to 12, a time point at which the tracking-target moving object is to appear is estimated on the basis of a time point at which each of the tracking-target moving object and the different moving object disappeared from a frame of the video captured by the first image capturing device and a time point at which the different moving object appeared in a frame of the video captured by the second image capturing device.

(Supplementary Note 14)

In the information processing method according to Supplementary Note 13, a time point at which the tracking-target moving object is to appear is estimated on the basis of a difference between a moving time period from the time point at which the different moving object disappeared from the frame of video captured by the first image capturing device to the time point at which the different moving object appeared in the frame of the video captured by the second image capturing device and a corresponding moving time period of a moving object in an ordinary case.

(Supplementary Note 15)

In the information processing method according to Supplementary Note 14, variation in moving time period from a time point of disappearing from a frame of the video captured by the first image capturing device to a time point of appearing in a frame of the video captured by the second image capturing device in an ordinary case is calculated, and a time point at which the tracking-target moving object is to appear is estimated on the basis of the variation.

(Supplementary Note 16)

In the information processing method according to any one of Supplementary Notes 7 to 15, when the different moving object located behind the tracking-target moving object in a moving direction in the video captured by the first image capturing device appeared in the video captured by the second image capturing device, notification is made.

(Supplementary Note 17)

A program causes a computer to execute:

a process of receiving an input of a video captured by each of a plurality of image capturing devices;

a process of selecting a different moving object that is different from a tracking-target moving object in the video captured by a first image capturing device of the plurality of image capturing devices, from among moving objects in the video captured by the first image capturing device; and a process of estimating a time point at which the tracking-target moving object is to appear, based on whether or not the different moving object has appeared in the video captured by a second image capturing device of the plurality of image capturing devices.

(Supplementary Note 18)

The program according to Supplementary Note 17 causes the computer to further execute a process of receiving an input of information on the tracking-target moving object.

(Supplementary Note 19)

In the program according to Supplementary Note 17 or 18, a moving object is selected as the different moving object from among the moving objects in the video captured by the first image capturing device, the selected moving object having a feature that is different from features of the moving objects by a value larger than a threshold value.

(Supplementary Note 20)

In the program according to Supplementary Note 19, a moving object having a feature that is different from features of the moving objects by a value larger than the threshold value is constantly detected, and the different moving object is selected from among the detected moving objects, each of which has a feature that is different from features of the moving objects by a value larger than the threshold value, in response to an input of information on the tracking-target moving object.

(Supplementary Note 21)

In the program according to any one of Supplementary Notes 17 to 20, a time point at which the tracking-target moving object is to appear is estimated on the basis of a time point at which each of the tracking-target moving object and the different moving object disappeared from a frame of the video captured by the first image capturing device, and a time point at which the different moving object appeared in a frame of the video captured by the second image capturing device.

(Supplementary Note 22)

In the program according to Supplementary Note 21, a time point at which the tracking-target moving object is to appear is estimated on the basis of a difference between a moving time period from the time point at which the different moving object disappeared from the frame of video captured by the first image capturing device to the time point at which the different moving object appeared in the frame of the video captured by the second image capturing device and a corresponding moving time period of a moving object in an ordinary case.

(Supplementary Note 23)

In the program according to Supplementary Note 22, variation in moving time period from a time point of disappearing from a frame of the video captured by the first image capturing device to a time point of appearing in a frame of the video captured by the second image capturing device in an ordinary case is calculated, and a time point at which the tracking-target moving object is to appear is estimated on the basis of the variation.

(Supplementary Note 24)

In the program according to any one of Supplementary Notes 17 to 23, when the different moving object located behind the tracking-target moving object in a moving direction in the video captured by the first image capturing device appeared in the video captured by the second image capturing device, notification is made.

This application claims the priority based on Japanese Patent Application No. 2013-085632 filed on Apr. 16, 2013, the entire disclosure of which is incorporated herein.

REFERENCE SIGNS LIST 1 monitoring system
100 information processing server
200 video camera
201 video acquisition unit
203 object analysis unit
205 object-detection, feature, and tracking information
207 reference-object selection unit
209 inter-camera reference-object association unit 211 camera location information
213 target-object appearing estimation unit
300 display device
400 input device
501 processor
503 memory
505 storage device
507 input interface
509 data interface
511 communication interface
513 display device
600 monitoring device
610 first input unit
620 second input unit
630 selection unit
640 estimation unit

The invention claimed is:

1. An information processing system comprising:
a memory storing instructions; and
at least one processor configured to execute the instructions to:
receive an input of a video captured by each of a plurality of image capturing devices;
select a different moving object that is different from a tracking-target moving object in the video captured by a first image capturing device of the plurality of image capturing devices, and that moves in a same direction as the tracking-target moving object, from among moving objects in the video captured by the first image capturing device; and
estimate a time point at which the tracking-target moving object is to appear in the video captured by a second image capturing device in the plurality of image capturing devices, based on a time point at which the selected different moving object has appeared in the video captured by the second image capturing device.

2. The information processing system according to claim 1, wherein the at least one processor is further configured to:
receive an input of information on the tracking-target moving object.

3. The information processing system according to claim 1, wherein the at least one processor is further configured to:
select, as the different moving object, a moving object from among the moving objects in the video captured by the first image capturing device, the selected moving object having a feature that is different from features of the moving objects by a value larger than a threshold value.

4. The information processing system according to claim 3, wherein the at least one processor is further configured to:
constantly detect a moving object having a feature that is different from features of the moving objects by a value larger than the threshold value, and select the different moving object from among the detected moving objects, each of which has a feature that is different from features of the moving objects by a value larger than the threshold value, in response to an input of information on the tracking-target moving object.

5. The information processing system according to claim 1, wherein the at least one processor is further configured to:
estimate a time point at which the tracking-target moving object is to appear, based on a time point at which each of the tracking-target moving object and the different moving object disappeared from a frame of the video captured by the first image capturing device and a time point at which the different moving object appeared in a frame of the video captured by the second image capturing device.

6. The information processing system according to claim 5, wherein the at least one processor is further configured to:
estimate a time point at which the tracking-target moving object is to appear, based on a difference between a moving time period from the time point at which the different moving object disappeared from the frame of video captured by the first image capturing device to the time point at which the different moving object appeared in the frame of the video captured by the second image capturing device and a corresponding moving time period of a moving object in an ordinary case.

7. The information processing system according to claim 6, wherein the at least one processor is further configured to:
calculate variation in moving time period from a time point of disappearing from a frame of the video captured by the first image capturing device to a time point of appearing in a frame of the video captured by the second image capturing device in an ordinary case, and estimate a time point at which the tracking-target moving object is to appear, on the basis of the variation.

8. The information processing system according to claim 1, wherein at least one processor is further configured to:
when the different moving object located behind the tracking-target moving object in a moving direction in the video captured by the first image capturing device appeared in the video captured by the second image capturing device,
make a notification.

9. An information processing method carried out by an information processing system, the information processing method comprising:
receiving an input of a video captured by each of a plurality of image capturing devices;
selecting a different moving object that is different from a tracking-target moving object in the video captured by a first image capturing device of the plurality of image capturing devices, and that moves in a same direction as the tracking-target moving object, from among moving objects in the video captured by the first image capturing device; and
estimating a time point at which the tracking-target moving object is to appear in the video captured by a second image capturing device in the plurality of image capturing devices, based on a time point at which the selected different moving object has appeared in the video captured by the second image capturing device.

10. A non-transitory computer readable medium storing a program causing a computer to execute:
receiving an input of a video captured by each of a plurality of image capturing devices;
selecting a different moving object that is different from a tracking-target moving object in the video captured by a first image capturing device of the plurality of image capturing devices, and that moves in a same direction as the tracking-target moving object, from among moving objects in the video captured by the first image capturing device; and
estimating a time point at which the tracking-target moving object is to appear in the video captured by a second image capturing device in the plurality of image capturing devices, based on a time point at which the selected different moving object has appeared in the video captured by the second image capturing device.

11. The information processing system according to claim 2, wherein the at least one processor is further configured to:
select, as the different moving object, a moving object from among the moving objects in the video captured by the first image capturing device, the selected moving object having a feature that is different from features of the moving objects by a value larger than a threshold value.

12. The information processing system according to claim 11, wherein the at least one processor is further configured to:
constantly detect a moving object having a feature that is different from features of the moving objects by a value larger than the threshold value, and select the different moving object from among the detected moving objects, each of which has a feature that is different from features of the moving objects by a value larger than the threshold value, in response to an input of information on the tracking-target moving object.

13. The information processing system according to claim 2, wherein the at least one processor is further configured to:
estimate a time point at which the tracking-target moving object is to appear, based on a time point at which each of the tracking-target moving object and the different moving object disappeared from a frame of the video captured by the first image capturing device and a time point at which the different moving object appeared in a frame of the video captured by the second image capturing device.

14. The information processing method according to claim 9, further comprising:
receiving an input of information on the tracking-target moving object.

15. The information processing method according to claim 9, wherein a moving object is selected as the different moving object from among the moving objects in the video captured by the first image capturing device, the selected moving object having a feature that is different from features of the moving objects by a value larger than a threshold value.

16. The information processing method according to claim 15, wherein a moving object having a feature that is different from features of the moving objects by a value larger than the threshold value is constantly detected, and the different moving object is selected from among the detected moving objects, each of which has a feature that is different from features of the moving objects by a value larger than the threshold value, in response to an input of information on the tracking-target moving object.

17. A non-transitory computer readable medium according to claim 10, causing computer to further execute:
receiving an input of information on the tracking-target moving object.

18. A non-transitory computer readable medium, according to claim 10, wherein a moving object is selected as the different moving object from among the moving objects in the video captured by the first image capturing device, the selected moving object having a feature that is different from features of the moving objects by a value larger than a threshold value.

19. A non-transitory computer readable medium, according to claim 18, wherein a moving object having a feature that is different from features of the moving objects by a value larger than the threshold value is constantly detected, and the different moving object is selected from among the detected moving objects, each of which has a feature that is different from features of the moving objects by a value larger than the threshold value, in response to an input of information on the tracking-target moving object.

* * * * *